US012614964B2

(12) United States Patent
Pickett et al.

(10) Patent No.: US 12,614,964 B2
(45) Date of Patent: Apr. 28, 2026

(54) MAGNETIC TRANSMISSION SYSTEMS WITH ECCENTRIC BEARING ASSEMBLIES

(71) Applicant: National Oilwell Varco, L.P., Houston, TX (US)

(72) Inventors: Geoffrey Alexander Pickett, Sugar Land, TX (US); Nicholas Craig Newman, Montgomery, TX (US); Mitchell Ryan Benson, Houston, TX (US); Nicholas Owen Babyak, College Station, TX (US); David Fernando Samano, College Station, TX (US); Christopher Gomez, College Station, TX (US); Shuo Liu, Sugar Land, TX (US); Ci He, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 177 days.

(21) Appl. No.: 18/683,838

(22) PCT Filed: Aug. 18, 2022

(86) PCT No.: PCT/US2022/040738
§ 371 (c)(1),
(2) Date: Feb. 15, 2024

(87) PCT Pub. No.: WO2023/023241
PCT Pub. Date: Feb. 23, 2023

(65) Prior Publication Data
US 2024/0364198 A1     Oct. 31, 2024

Related U.S. Application Data

(60) Provisional application No. 63/234,590, filed on Aug. 18, 2021.

(51) Int. Cl.
*H02K 49/10*          (2006.01)

(52) U.S. Cl.
CPC ................................. *H02K 49/102* (2013.01)

(58) Field of Classification Search
CPC .... H02K 49/102; H02K 49/106; H02K 41/06; H02K 41/065
(Continued)

(56) References Cited

U.S. PATENT DOCUMENTS 5,013,949 A      5/1991  Mabe, Jr.
5,545,943 A *   8/1996  Satake ................... H02K 41/06
                                                                                  310/82
(Continued)

FOREIGN PATENT DOCUMENTS

CN            209925525 U      1/2020
WO           2006/133703 A1    12/2006
WO           WO-2013138971 A1 *   9/2013   .......... H02K 49/102

OTHER PUBLICATIONS

Machine translation of WO-2013138971-A1. (Year: 2013).*

(Continued)

*Primary Examiner* — Michael Andrews
(74) *Attorney, Agent, or Firm* — Conley Rose. P.C.

(57)          ABSTRACT

A magnetic transmission system includes an outer gear ring including an outer plurality of permanent magnets and configured to rotate about a rotational drive axis, an inner gear ring positioned within the outer gear ring and including an inner plurality of permanent magnets magnetically coupled to the outer plurality of permanent magnets, and an eccentric bearing assembly configured to convert orbital motion of the inner gear ring about the rotational drive axis into rotational motion of the eccentric bearing assembly about a bearing rotational axis that is radially offset from the rotational drive axis, and a first drive shaft coupled to the (Continued)

outer gear ring and a second drive shaft coupled to the inner gear ring, wherein the outer gear ring and the inner gear ring are configured to provide a gear ratio between the first drive shaft and the second drive shaft.

23 Claims, 9 Drawing Sheets

(58) Field of Classification Search
USPC .................................................. 310/103–106
See application file for complete search history.

(56) References Cited

U.S. PATENT DOCUMENTS

| | | |
|---|---|---|
| 2011/0253498 A1 | 10/2011 | Montgomery et al. |
| 2013/0134815 A1 | 5/2013 | Powell et al. |
| 2013/0205942 A1 | 8/2013 | Chicurel Uziel et al. |
| 2014/0224064 A1* | 8/2014 | Tesar ........................ F16H 1/32 |
| | | 74/606 R |
| 2016/0049855 A1* | 2/2016 | Davey ...................... H02K 7/11 |
| | | 175/170 |
| 2017/0110956 A1* | 4/2017 | Morris ................. H02K 49/102 |
| 2020/0063793 A1 | 2/2020 | Rossberger |
| 2020/0088159 A1* | 3/2020 | Stoesser ................. H02K 51/00 |

OTHER PUBLICATIONS

Extended European Search Report dated May 14, 2025, for Application No. EP 22859160.8.
International Search Report and Written Opinion dated Nov. 16, 2022, for Application No. PCT/US2022/040738.

* cited by examiner

MAGNETIC TRANSMISSION SYSTEMS WITH ECCENTRIC BEARING ASSEMBLIES

CROSS-REFERENCE TO RELATED APPLICATIONS

The present application is a 35 U.S.C. § 371 national stage application of PCT/US2022/040738 filed Aug. 18, 2022, entitled "Magnetic Transmission System", which claims priority to U.S. provisional patent application No. 63/234, 590 filed Aug. 18, 2021, entitled "Magnetic Transmission System", both of which are incorporated herein in their entirety for all purposes.

STATEMENT REGARDING FEDERALLY SPONSORED RESEARCH OR DEVELOPMENT

Not applicable.

BACKGROUND

Transmission systems are utilized in a wide range of applications in order to provide speed and torque conversions from a rotating power source to another device. Transmissions may comprise a gear train comprising a plurality of gears mechanically coupled together in a manner in which the speed and torque varies from that provided at an input to the transmission to that provided at an output of the transmission. For example, a gearbox may comprise a plurality of gears having varying numbers of teeth enmeshed with each other. However, due to being mechanically coupled together, gearboxes are subject to excessive wear, vibration, noise, and other issues. Alternatively, some transmission systems comprise a magnetic gear train in which a plurality of magnetic gears are coupled together magnetically rather than mechanically. Avoiding a mechanical connection in which the gears of the gear train make mechanical contact, the magnetic gear train may exhibit reduced wear, vibration, and noise relative to mechanical gear trains.

SUMMARY

An embodiment of a magnetic transmission system comprises an outer gear ring comprising an outer plurality of permanent magnets and configured to rotate about a rotational drive axis, an inner gear ring positioned within the outer gear ring and comprising an inner plurality of permanent magnets magnetically coupled to the outer plurality of permanent magnets, and an eccentric bearing assembly configured to convert orbital motion of the inner gear ring about the rotational drive axis into rotational motion of the eccentric bearing assembly about a bearing rotational axis that is radially offset from the rotational drive axis, and a first drive shaft coupled to the outer gear ring and a second drive shaft coupled to the inner gear ring, wherein the outer gear ring and the inner gear ring are configured to provide a gear ratio between the first drive shaft and the second drive shaft. In some embodiments, the inner gear ring is coupled to the first drive shaft by an eccentric lobe comprising a central axis that is radially offset from the rotational drive axis. In some embodiments, the bearing rotational axis comprises an inner bearing rotational axis of the eccentric bearing assembly and wherein the bearing assembly also comprises an outer bearing rotational axis radially offset from inner bearing rotational axis, and wherein the radial offset between the central axis of the eccentric lobe and the rotational drive axis is equal to the radial offset between the inner bearing rotational axis and the outer bearing rotational axis. In certain embodiments, the outer gear ring comprises a plurality of separate outer magnetic rotors spaced along the rotational drive axis and the inner gear ring comprises a plurality of separate inner magnetic rotors spaced along the rotational drive axis, and the inner gear ring comprises a plurality of the eccentric bearing assemblies, wherein each of the plurality of inner magnetic rotors comprises at least one of the plurality of eccentric bearing assemblies. In some embodiments, the bearing rotational axis comprises an inner bearing rotational axis, and the eccentric bearing assembly comprises a bearing spacer, an outer bearing assembly rotatable about an outer bearing rotational axis, and an inner bearing assembly rotatable about the inner bearing rotational axis which is radially offset from the outer bearing rotational axis In some embodiments, the magnetic transmission system comprises an internal support structure comprising a static plate and a rigidity plate connected to the static plate by a static rod radially offset from the rotational drive axis and extending between the static plate and the rigidity plate, and wherein the static rod extends through the inner gear ring. In certain embodiments, the static rods prevent the inner gear ring from rotating about the rotational drive axis. In certain embodiments, the magnetic transmission system comprises a sensor assembly configured to monitor a radial gap formed between the inner gear ring and the outer gear ring.

An embodiment of a magnetic transmission system comprises an outer gear ring comprising an outer plurality of permanent magnets and configured to rotate about a rotational drive axis, an inner gear ring positioned within the outer gear ring and comprising an inner plurality of permanent magnets magnetically coupled to the outer plurality of permanent magnets, and an eccentric bearing assembly comprising a bearing spacer, an outer bearing assembly rotatable about an outer bearing rotational axis, and an inner bearing assembly rotatable about an inner bearing rotational axis of the bearing spacer that is radially offset from the outer bearing rotational axis, and a first drive shaft coupled to the outer gear ring and a second drive shaft coupled to the inner gear ring, wherein the outer gear ring and the inner gear ring are configured to provide a gear ratio between the first drive shaft and the second drive shaft. In some embodiments, the eccentric bearing assembly comprises an arcuate counterweight coupled to the bearing spacer. In some embodiments, the outer bearing assembly is positioned on an outer cylindrical surface of the bearing spacer that defines the outer bearing rotational axis, and the inner bearing assembly is positioned on an inner cylindrical surface of the bearing spacer that defines the inner bearing rotational axis. In certain embodiments, the outer gear ring comprises a plurality of separate outer magnetic rotors spaced along the rotational drive axis and the inner gear ring comprises a plurality of separate inner magnetic rotors spaced along the rotational drive axis, and the inner gear ring comprises a plurality of the eccentric bearing assemblies, wherein each of the plurality of inner magnetic rotors comprises at least one of the plurality of eccentric bearing assemblies. In certain embodiments, the inner gear ring is coupled to the first drive shaft by an eccentric lobe comprising a central axis that is radially offset from the rotational drive axis, and the radial offset between the central axis of the eccentric lobe and the rotational drive axis is equal to the radial offset between the inner bearing rotational axis and the outer bearing rotational axis. In some embodiments, an internal support structure comprising a static plate and a rigidity plate connected to the static plate by a static rod radially offset from the rotational drive axis and extending between the static plate and the rigidity plate, and wherein the static rod extends through the inner gear ring. In some embodiments, the static rods prevent the inner gear ring from rotating about the rotational drive axis. In certain embodiments, the magnetic transmission system comprises a sensor assembly configured to monitor a radial gap formed between the inner gear ring and the outer gear ring.

An embodiment of a magnetic transmission system comprises an outer gear ring comprising an outer plurality of permanent magnets and configured to rotate about a rotational drive axis, an inner gear ring positioned within the outer gear ring and comprising an inner plurality of permanent magnets magnetically coupled to the outer plurality of permanent magnets, a first drive shaft coupled to the outer gear ring and a second drive shaft coupled to the inner gear ring, wherein the outer gear ring and the inner gear ring are configured to provide a gear ratio between the first drive shaft and the second drive shaft, and an internal support structure comprising a static plate, and a rigidity plate positioned in the outer gear ring and connected to the static plate by a static rod radially offset from the rotational drive axis and extending between the static plate and the rigidity plate, and wherein the static rod extends through the inner gear ring. In some embodiments, the static rods prevent the inner gear ring from rotating about the rotational drive axis. In some embodiments, a plurality of gussets extending radially from the rotational drive axis are formed on the static plate and the rigidity plate of the internal support structure. In certain embodiments, the internal support structure further comprises an elongate rigidity member coupled to and extending between the static plate and the rigidity plate, wherein the rigidity member has a non-circular cross-section. In some embodiments, the magnetic transmission system comprises an eccentric bearing assembly comprising a bearing spacer, an outer bearing assembly rotatable about an outer bearing rotational axis, and an inner bearing assembly rotatable about an inner bearing rotational axis of the bearing spacer that is radially offset from the outer bearing rotational axis. In some embodiments, the static rod is rotatably coupled to the inner gear ring by the eccentric bearing assembly. In certain embodiments, the magnetic transmission system comprises a sensor assembly configured to monitor a radial gap formed between the inner gear ring and the outer gear ring.

BRIEF DESCRIPTION OF THE DRAWINGS

For a detailed description of disclosed exemplary embodiments, reference will now be made to the accompanying drawings in which.

DETAILED DESCRIPTION

Figure 1:
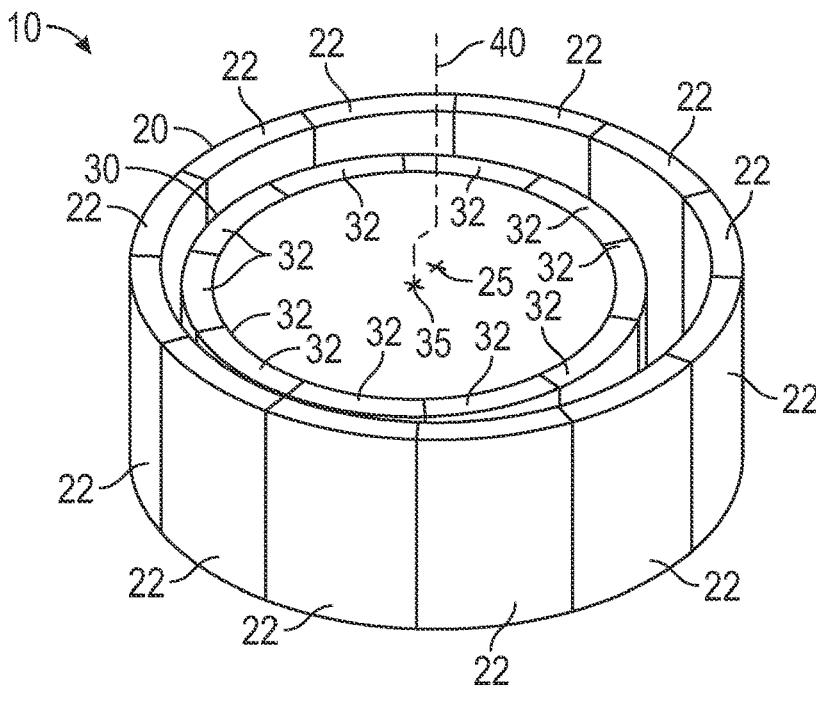
FIGS. 1, 2 are schematic views of a magnetic transmission system according to some embodiments.

The following discussion is directed to various embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection as accomplished via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation.

As described above, transmission systems may comprise magnetic gear trains or transmissions in which a plurality of magnetic gears are coupled together magnetically rather than mechanically. In this arrangement, as with a mechanical transmission, the speed and power of a rotational input provided to the magnetic transmission varies from the speed and power of a rotational output of the magnetic gear train. In some magnetic transmissions an inner gear ring comprising a plurality of permanent magnets may be mechanically coupled to a first shaft (e.g., an input or output shaft of the magnetic transmission) whereby the inner gear ring may orbit a rotational drive axis of the first shaft. The orbital motion of the inner gear ring may be translated into a rotational motion of an outer or exterior gear ring of the magnetic transmission comprising a plurality of permanent magnets about the rotational drive axis. The outer gear ring may be mechanically coupled to a second shaft of the magnetic transmission which may rotate at a different speed from the first shaft as defined by a gear ratio provided between the inner gear ring and the outer gear ring.

In at least some applications, rotational torque is transferred between the inner and outer gear rings in a manner whereby a non-unitary gear ratio (e.g., a gear ratio greater than 1:1 or less than 1:1) is provided therebetween by inducing cycloidal or orbital motion in the inner gear ring about the rotational drive axis of the magnetic transmission in response to either rotating the first shaft mechanically coupled to the inner gear ring about the rotational drive axis or rotating the outer gear ring about the rotational drive axis. Magnetic interaction or coupling between the orbiting inner gear ring and the rotating outer gear ring results in a change in rotational speed and torque between the first shaft coupled to the inner gear ring and the second shaft coupled to the outer gear ring.

As described above, the rotational motion of the first shaft is translated into orbital motion of the inner gear ring about the axis of rotation of the magnetic transmission. The inner gear ring is typically prevented from rotating about the axis of rotation in order to prevent the inner gear ring from magnetically and rotationally locking to the outer gear ring such that the inner and outer gear rings rotate in unison. In some applications, it may be desired to prevent the inner gear ring from rotating about its own central axis and may only be allowed to orbit the rotational axis of the magnetic transmission. Additionally, in some applications, it may be desired to provide the magnetic transmission with a plurality of separate inner gear rings and corresponding outer gear rings extending in parallel in order to minimize vibration of the magnetic transmission during operation caused by the orbital motion of the one or more inner gear rings.

Accordingly, embodiments disclosed herein include magnetic transmission system comprising an outer gear ring and an inner gear ring magnetically coupled to the outer gear ring, wherein the inner gear ring includes an eccentric bearing assembly which prohibits rotation of the inner gear ring about a rotational drive axis of the magnetic transmission system while permitting the inner gear ring to orbit the rotational drive axis. Additionally, the eccentric bearing assembly comprises an eccentric bearing spacer configured to translate the orbital motion of the inner gear ring into concentric rotational motion about a bearing axis of the eccentric bearing assembly. In this manner, a static rod of an internal support structure of the magnetic transmission system may be directly and rotatably coupled to the eccentric bearing assembly in a manner that physically supports the inner gear ring, thereby minimizing deflections of the inner gear ring during operation, while prohibiting the inner gear ring from rotating about the rotational drive axis.

Embodiments disclosed herein also include an internal support structure including, in addition to the static rod, a static plate and a rigidity plate coupled to the static plate by the static rod. The rigidity plate may be positioned within the outer gear ring and thus may not be directly supported by an external support feature. However, the static rod may provide physical support to the rigidity plate by connecting the rigidity plate to the static plate of the internal support structure, which may itself be externally supported. Additionally, embodiments disclosed herein also include an internal support structure comprising a rigidity member having a non-circular cross-section and coupled between the static and rigidity plates to augment the structural integrity of the internal support structure.

Figure 2:
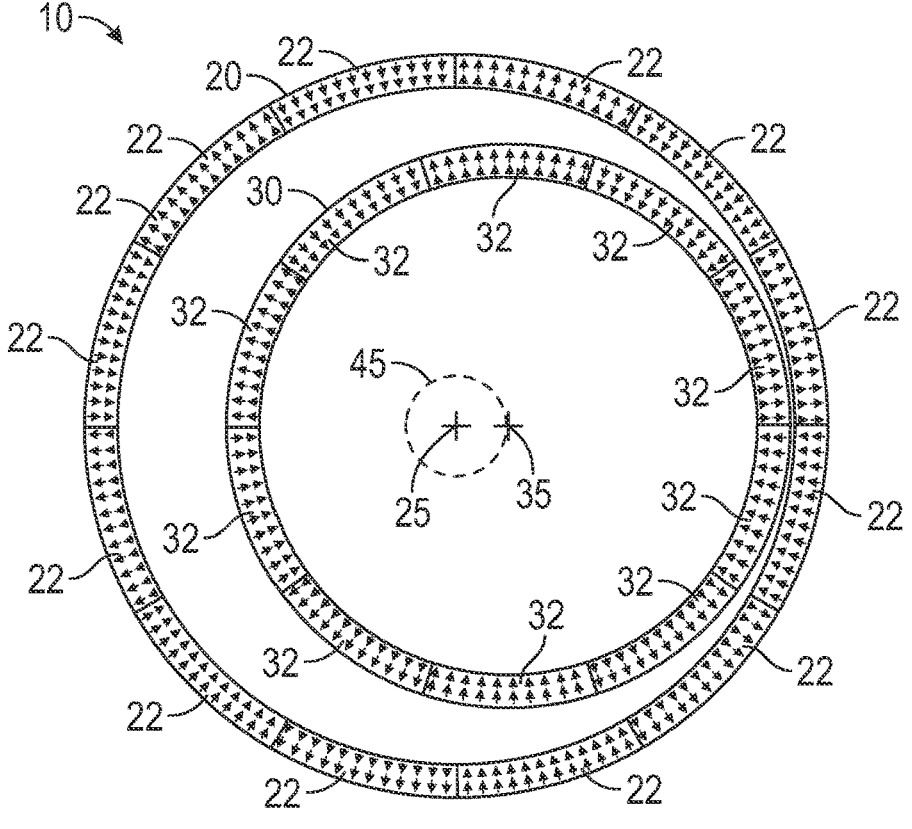
Figures 3, 4:
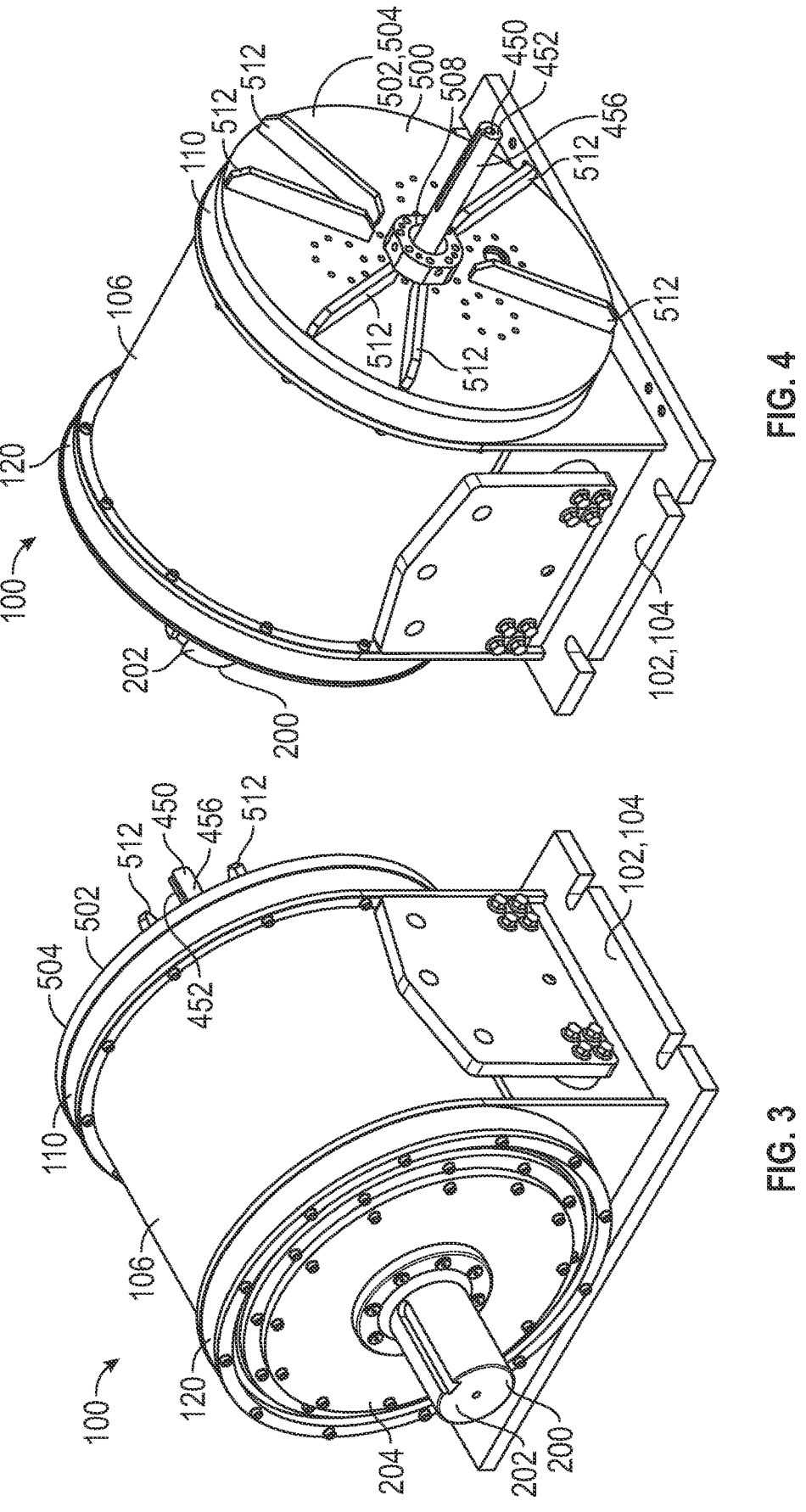
FIGS. 3, 4 are perspective views of another magnetic transmission system according to some embodiments.

Referring initially to FIGS. 1, 2, an embodiment of a magnetic transmission system or gearbox 10 is shown schematically. Magnetic transmission system 10 generally includes an outer gear ring 20 and an inner gear ring 30 magnetically coupled to the outer gear ring 20. The outer gear ring 20 carries a plurality of generally arcuate permanent magnets 22 positioned circumferentially about a central axis 25 of the outer gear ring 20. The inner gear ring 30 similarly carries a plurality of generally arcuate permanent magnets 32 positioned circumferentially about a central axis 35 of the inner gear ring 30. In this embodiment, the number of permanent magnets 32 of the inner gear ring 30 is less than the number of permanent magnets 22 of the outer gear ring 20.

In some embodiments, during operation of magnetic transmission system 10, the inner gear ring 30 may be driven by an input drive shaft 40 mechanically coupled to the inner gear ring 30, inducing cycloidal motion in the inner gear ring 30 such that the central axis 35 of inner gear ring 30 orbits the central axis 25 of outer gear ring 20 along a circular trajectory 45. The outer gear ring 20 may be mechanically coupled to an output shaft (not shown in FIGS. 1, 2). For instance, input drive shaft 40 may coupled to a prime mover (e.g., an electric motor, an internal combustion engine, etc.) while the output shaft is connected to a device driven by the prime mover (e.g., a propeller, an impeller, one or more wheels, etc.). In other embodiments, the outer gear ring 20 may be mechanically coupled to an input drive shaft while the input drive shaft 40 shown in FIGS. 1, 2 may comprise an output shaft of the magnetic transmission system 10.

As inner gear ring 30 travels cycloidally within outer gear ring 20, the permanent magnets 32 of inner gear ring 30 that are in greatest proximity to the outer gear ring 20 inhibit slippage from their nearest permanent magnet 32. The gear operation (i.e., conversion of an input torque/speed torque/ speed to an output torque/speed) produced between input drive shaft 40 and the outer gear ring 20 is driven by the difference in the number of the permanent magnets 22, 32, with the largest breakout torque being realized when the pole pair difference between the outer and inner gear rings 20, 30 is one. In other words, the largest torque occurs when the outer gear ring 20 slips approximately half of a magnetic pole pitch back from its closest fixed magnet mate.

To prevent inner gear ring 30 from rotationally locking with outer gear ring 20 in response to the magnetic coupling formed between gear rings 20, 30, the inner gear ring 30 is prohibited from rotating about its own central axis 35. For instance, in an example where the outer gear ring 20 comprises 31 pole pairs provided by 62 permanent magnets 22 while the inner gear ring 30 comprises 30 pole pairs provided by 60 permanent magnets 32, the outer gear ring 20 may rotate about central axis 25 approximately $2/62*360°$ for every complete revolution of the central axis 35 of the inner gear ring 30 about the trajectory 45. In this example, the magnetic transmission system 10 thereby provides a gear ratio of 61:2 or 30.5:1 between the input drive shaft 40 and the outer gear ring 20. If it is desired to reduce rotational speed rather than increase rotational speed, the input drive shaft may instead be mechanically coupled to outer gear ring 20 with input drive shaft 40 serving as an output shaft of the magnetic transmission system 10.

Referring now to FIGS. 3-8, an embodiment of a magnetic transmission system 100 is shown. In this exemplary embodiment, magnetic transmission system 100 generally includes an outer or external support frame or structure 102, an outer or external gear ring 150, a first or outer drive shaft 200, an inner or interior gear ring 250, a second or inner drive shaft 450, and an inner or internal support frame or structure 500. As will be described further herein, magnetic transmission system 100 may operate in a manner similar manner to the magnetic transmission system 10 shown in FIGS. 1, 2 whereby magnetic transmission system 100 may be operated to vary a rotational speed and torque via the magnetically coupled gear rings 150, 250.

In this exemplary embodiment, external support structure 102 generally includes a support base 104, an outer support cylinder or housing 106, and a pair of annular bearing assemblies 110, 120. As shown particularly in FIGS. 3, 4, support base 104 physically supports magnetic transmission system 100 and may permit the magnetic transmission system 100 to be coupled (e.g., via one or more fasteners not shown in FIGS. 3-8) to a mount of a system in which the magnetic transmission system 100 is incorporated such as, for example, a wind turbine, a motor vehicle, a drilling system, etc.

The support housing 106 of external support structure 102 is coupled to and physically supported by the support base 104. Support housing 106 comprises a central passage in which the component of magnetic transmission system 100 (e.g., outer gear ring 150, inner gear ring 250, internal support structure 500) are received. Each longitudinal end of the support housing 106 are coupled to one of the bearing assemblies 110, 120 of external support structure 102. Each bearing assembly 110, 120 may comprise a roller bearing including a plurality of ball bearings, rollers, etc. Bearing assemblies 110, 120 permit outer gear ring 150 to rotate relative to support housing 106 while permitting loads to be transferred from outer gear ring 150 to be transferred to the external support structure 102. In other embodiments, the configuration of external support structure 102 may vary from that shown in FIGS. 3, 4.

Figure 6:
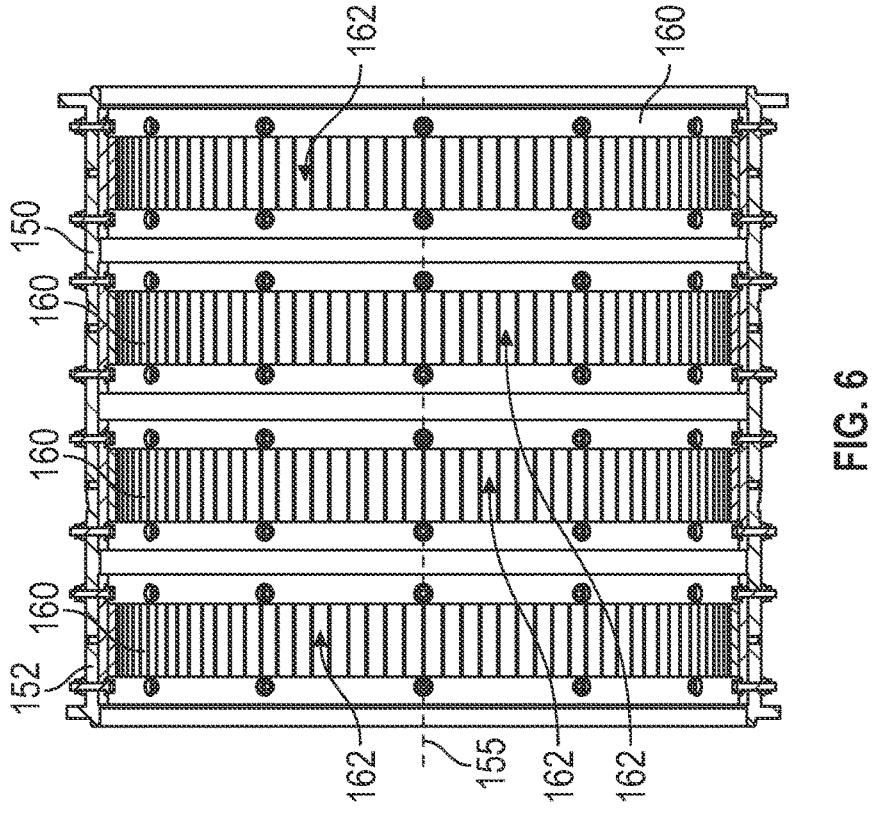
FIG. 6 is a side cross-sectional view of the outer gear ring of FIG. 5.
Figure 5:
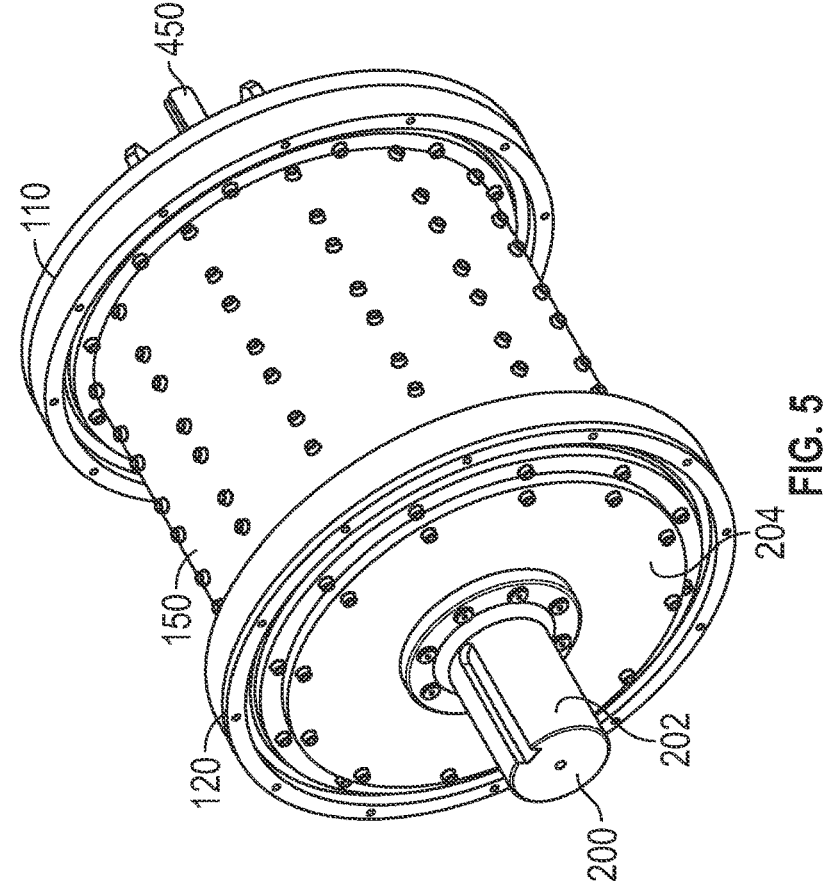
FIG. 5 is a perspective view of an outer gear ring, an inner gear ring, an inner drive shaft, an outer drive shaft, and an internal support structure of the magnetic transmission system of FIGS. 3, 4 according to some embodiments.

As shown particularly in FIGS. 5, 6, outer gear ring 150 has a central or longitudinal axis 155 and generally includes an outer support sleeve 152 and a plurality of separate outer or exterior magnetic rotors 160 arranged in parallel with each other and each positioned coaxial with central axis 155. Each outer magnetic rotor 160 is positioned within and coupled to the outer support sleeve 152 of outer gear ring 150. Outer support sleeve 152 is in-turn rotatably coupled to external support structure 102 via bearing assemblies 110, 120 which permit relative rotation of outer gear ring 150 about central axis 155 relative to external support structure 102.

In this exemplary embodiment, outer magnetic rotors 160 are spaced along the central axis 155 such that magnetic rotors 160 are separated from each other by a plurality of axially extending gaps or openings. Each outer magnetic rotor 160 comprises a plurality of permanent magnets (indicated generally by arrows 162 in FIG. 6) positioned circumferentially about central axis 155. Outer rotor permanent magnets 162 are arranged in a sequence of reversing polarity whereby the plurality of outer rotor permanent magnets 162 form a plurality of pole pairs equal to half the total numbers of outer rotor permanent magnets 162 of a given outer magnetic rotor 160.

Outer drive shaft 200 is mechanically coupled to outer gear ring 150 such that outer drive shaft 200 is configured to rotate in concert with outer gear ring 150 about the central axis 155 of outer gear ring 150 which may also be referred to herein as rotational drive axis 155. In this exemplary embodiment, outer drive shaft 200 generally includes a central stub shaft 202 coupled to a radially extending hub 204 which couples to an end of the outer support sleeve 152 of outer gear ring 150 such that outer drive shaft 200 is rotationally locked to outer gear ring 150. In other embodiments, the configuration of outer drive shaft 200 may vary. In this exemplary embodiment, outer drive shaft 200 comprises an output shaft of magnetic transmission system 100 configured to provide rotational torque to a device of the system (e.g., wind turbine, motor vehicle, etc.) in which magnetic transmission system 100 is incorporated. However, in other embodiments, outer drive shaft 200 may comprise an input shaft of magnetic transmission system 100 configured to receive rotational torque from the prime mover of the system in which the magnetic transmission system 100 is incorporated.

Figure 7:
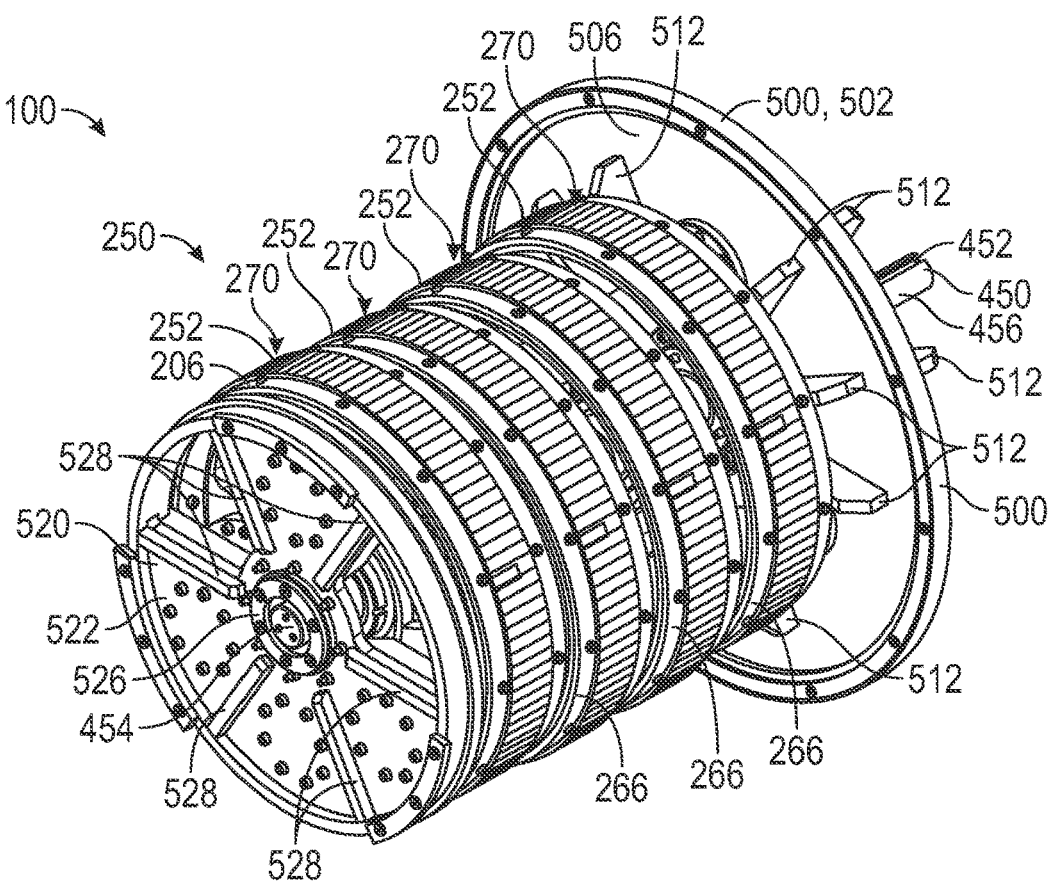
FIG. 7 is a perspective view of the inner gear ring, the inner drive shaft, and the internal support structure of FIG. 5.
Figure 8:
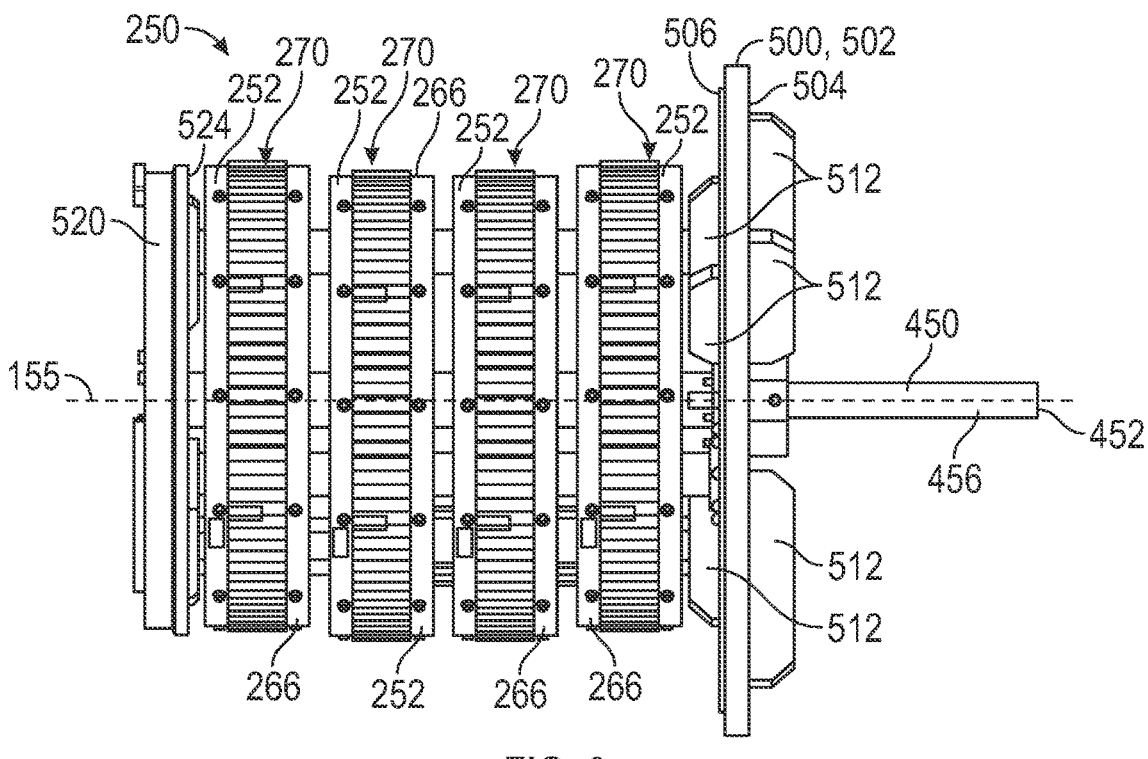
FIG. 8 is a side view of the inner gear ring, the inner drive shaft, and the internal support structure of FIG. 5.

As shown particularly in FIGS. 7, 8, inner gear ring 250 of magnetic transmission system 100 comprises a plurality of separate inner or interior magnetic rotors 252 arranged in parallel with each other. In this exemplary embodiment, inner magnetic rotors 252 are spaced along the central axis 155 of outer gear ring 150 such that inner magnetic rotors 252 are separated from each other by a plurality of axially extending gaps or openings. Unlike the outer magnetic rotors 160 of outer gear ring 150, inner magnetic rotors 252 are not positioned coaxially with each other along a shared central axis. Instead, each inner magnetic rotor 252 are radially offset from one or more of the other inner magnetic rotors 252.

In this exemplary embodiment, the intermediate two inner magnetic rotors 252 of the four rotors 252 of inner gear ring 250 are positioned coaxial with each other but are radially offset from the outer two inner magnetic rotors 252 of the four rotors 252 of inner gear ring 250. Additionally, like the two intermediate inner magnetic rotors 252, the outer two magnetic rotors 252 of the four inner magnetic rotors 252 are positioned coaxially. As will be described further herein, the radial offset provided between the plurality of inner magnetic rotors 252 reduces the amount of vibration provided by inner gear ring 250 during operation. Additionally, in this exemplary embodiment, each of the inner magnetic rotors 252 are mechanically coupled to the inner drive shaft 450 of magnetic transmission system 100 in a manner that permits inner drive shaft 450 to rotate relative to the plurality of inner magnetic rotors 252 while inducing cycloidal movement in the inner magnetic rotors 252 such that each rotor 252 orbits the central axis 155 of the outer gear ring 150. Central axis 155 may also be referred to herein as a rotational drive axis 155 of magnetic transmission system 100 given that outer drive shaft 200 and inner drive shaft 450 each rotate about rotational drive axis 155 during the operation of magnetic transmission system 100.

Referring to FIGS. 7-14, additional views of one of the inner magnetic rotors 252 of inner gear ring 250 and components thereof are shown in FIGS. 9-14. In this exemplary embodiment, each inner magnetic rotor 252 generally includes a hub 254, a central bearing assembly 264, a plurality of inner rotor permanent magnets 270 (indicated generally by arrows 270), and a plurality of eccentric bearing assemblies 300.

The hub 254 of each inner magnetic rotor 252 comprises a central opening or passage 256, a plurality of circumferentially spaced spokes 258 extending radially outwards away from central passage 256, and an outer ring 260 connected to a radially outer end of each of the spokes 258.

Additionally, each of the spokes 258 of hub 254 comprises a bearing receptacle 262 (shown in FIG. 10) formed therein. A central bearing assembly 264 is received within the central passage 256 of hub 254. Central bearing assembly 264 may comprise a roller bearing including a plurality of ball bearings, rollers, etc. Central bearing assembly 264 rotatably couples the inner magnetic rotor 252 with the inner drive shaft 450 of magnetic transmission system 100 whereby inner drive shaft 450 is permitted to rotate about the rotational drive axis 155 relative to the inner magnetic rotor 252.

In this exemplary embodiment, a sleeve 266 is positioned about and coupled to an outer cylindrical surface of the outer ring 260 of hub 254. The plurality of inner rotor permanent magnets 270 are positioned on an outer cylindrical surface of the sleeve 266. Inner rotor permanent magnets 270 are arranged in a sequence of reversing polarity whereby the plurality of inner rotor permanent magnets 270 form a plurality of pole pairs equal to half the total numbers of inner rotor permanent magnets 270 of a given inner magnetic rotor 252. The total number of inner rotor permanent magnets 270 of each inner magnetic rotor 252 may be less than the total number of outer rotor permanent magnets 162 of a corresponding outer magnetic rotor 160 to thereby define a gear ratio provided by the magnetic transmission system 100.

In this exemplary embodiment, each of the bearing receptacles 262 of hub 254 receives one of the eccentric bearing assemblies 300 of the inner magnetic rotor 252. As will be described further herein, eccentric bearing assemblies 300 couple with the internal support structure 500 of magnetic transmission system 100 to prohibit the inner magnetic rotor 252 from rotating about a central or longitudinal axis 255 (shown extending out of the page in FIG. 9) thereof.

As shown particularly in FIGS. 10-14, each eccentric bearing assembly 300 generally includes a pair of opposing outer retention assemblies 302, an outer bearing assembly 310, a pair of opposing generally arcuate counterweights or balancing rods 320, a pair of opposing inner retention assemblies 330, an eccentric bearing spacer 340, and an inner bearing assembly 370. Outer retention assemblies 302 couple the eccentric bearing assembly 300 to the hub 254 such that the eccentric bearing assembly 300 is secured or retained within the given bearing receptacle 262 in which it is received. In this exemplary embodiment, each outer retention assembly 302 comprises an outer seal and an outer retention plate. The outer retention seals of outer retention assemblies 302 protect the outer bearing assembly 310 from debris or other contaminants during the operation of magnetic transmission system 100. The outer retention plates of outer retention assemblies 302 couple (e.g., via a plurality of fasteners) to opposing faces or surfaces of the hub 254 of inner magnetic rotor 252.

Figures 9, 10:
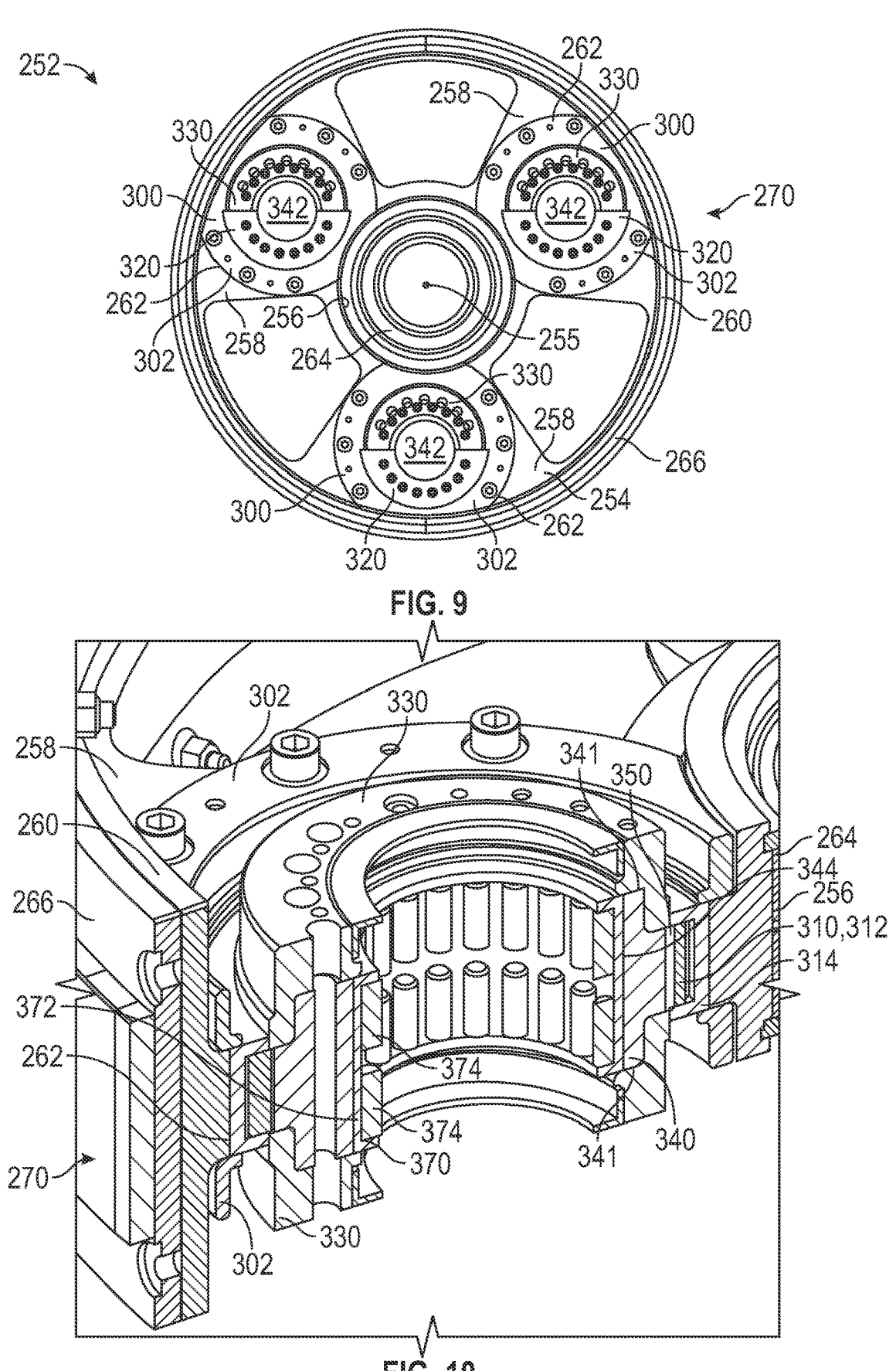
FIG. 9 is a front view of an inner magnetic rotor of the inner gear ring of FIG. 5 according to some embodiments.
FIG. 10 is a perspective cross-sectional view of the inner magnetic rotor of FIG. 9.
Figures 11, 12:
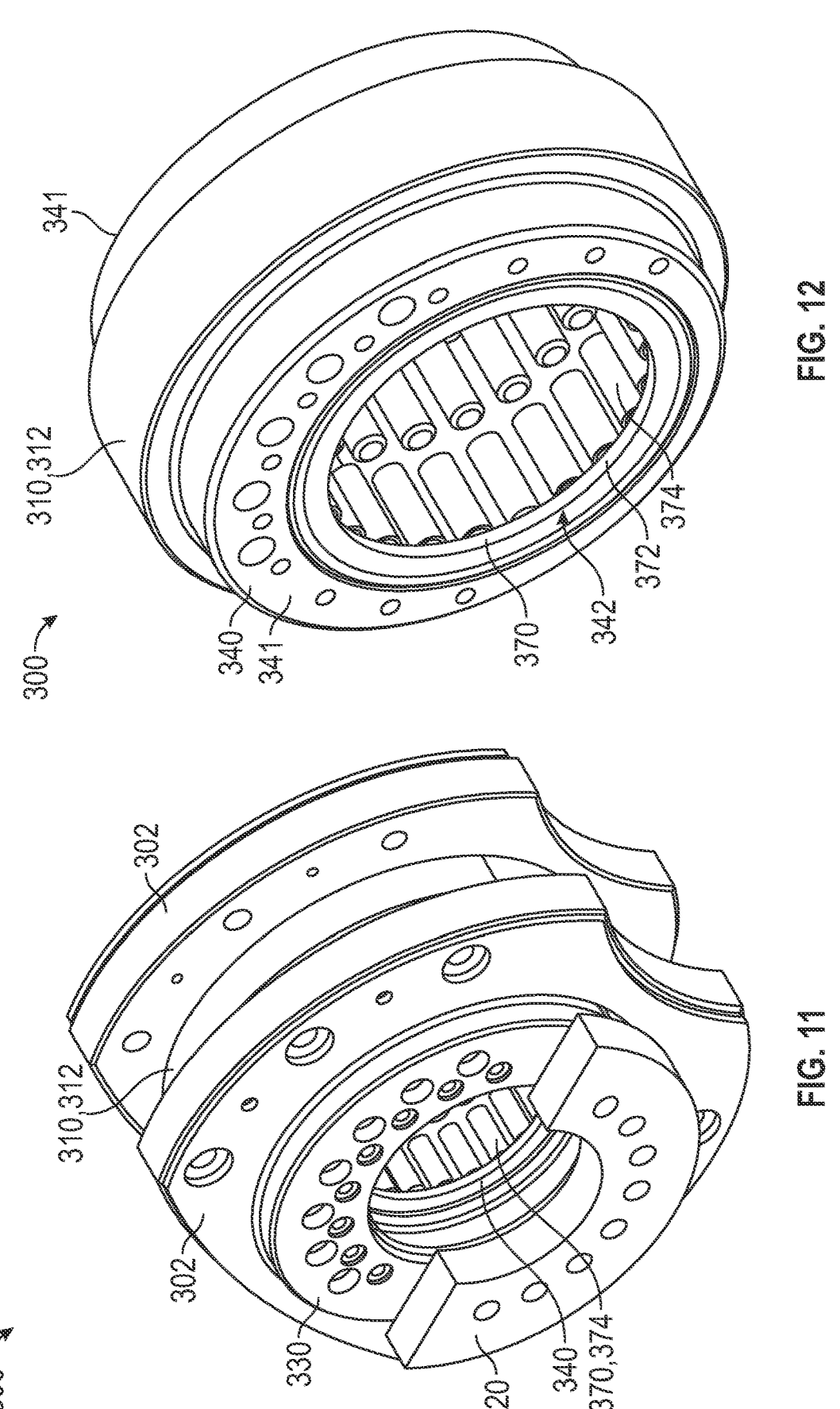
FIG. 11 is a perspective view of an eccentric bearing assembly of the inner magnetic rotor of FIG. 9 according to some embodiments.
FIG. 12 is a perspective view of an inner bearing assembly, an eccentric bearing spacer, and an outer bearing assembly of the eccentric bearing assembly of FIG. 11 according to some embodiments.

As shown particularly in FIG. 10, the outer bearing assembly 310 comprises a plurality of cylindrical rollers 312 housed within a bearing race 314. Outer bearing assembly 310 permits relative rotation between the hub 254 of the inner magnetic rotor 252 and the inner retention assemblies 330, counterweights 320, bearing spacer 340, and inner bearing assembly 370. In other embodiments, the configuration of outer bearing assembly 310 may vary; for example, outer bearing assembly 310 may comprise a plurality of ball bearings or other types of rolling elements other than cylindrical rollers 312.

In this exemplary embodiment, the pair of counterweights 320 of the eccentric bearing assembly 300 are coupled to the inner retention assemblies 330 of the eccentric bearing assembly 300 with each extend arcuately approximately 180 degrees. Counterweights 320 are configured to stabilize and minimize vibration in the inner magnetic rotor 252 during the operation of magnetic transmission system 100 by counterbalancing the vibratory and harmonic forces produced by the cycloidal motion of the inner magnetic rotor 252.

The inner retention assemblies 330 couple the inner bearing assembly 370 of the eccentric bearing assembly 300 to the bearing spacer 340 thereof such that the inner bearing assembly 370 or secured or retained within the bearing spacer 340. In this exemplary embodiment, each inner retention assembly 330 comprises an inner seal and an inner retention plate. The inner retention seals of inner retention assemblies 330 protect the inner bearing assembly 370 from debris or other contaminants during the operation of magnetic transmission system 100. The inner retention plates of inner retention assemblies 330 couple (e.g., via a plurality of fasteners) to opposing faces or surfaces of bearing spacer 340.

Eccentric bearing spacer 340 of the eccentric bearing assembly 300 is configured to convert the orbital motion of hub 254 about the rotational drive axis 155 into rotation about a rotational axis 375 of the inner bearing assembly 370 of the eccentric bearing assembly 300. As shown particularly in FIGS. 13, 14, in this exemplary embodiment, bearing spacer 340 comprises a pair of opposing endfaces or surfaces 341 and a central opening or passage 342. Bearing spacer 340 additionally includes a generally cylindrical inner bearing surface 344 and a generally cylindrical outer bearing surface 350. The inner bearing surface 344 of bearing spacer 340 has a central or longitudinal axis which is coaxial with the rotational axis 375 of the inner bearing assembly 370. Thus, axis 375 may also be referred to herein as the central axis 375 of inner bearing surface 344.

Figures 13, 14:
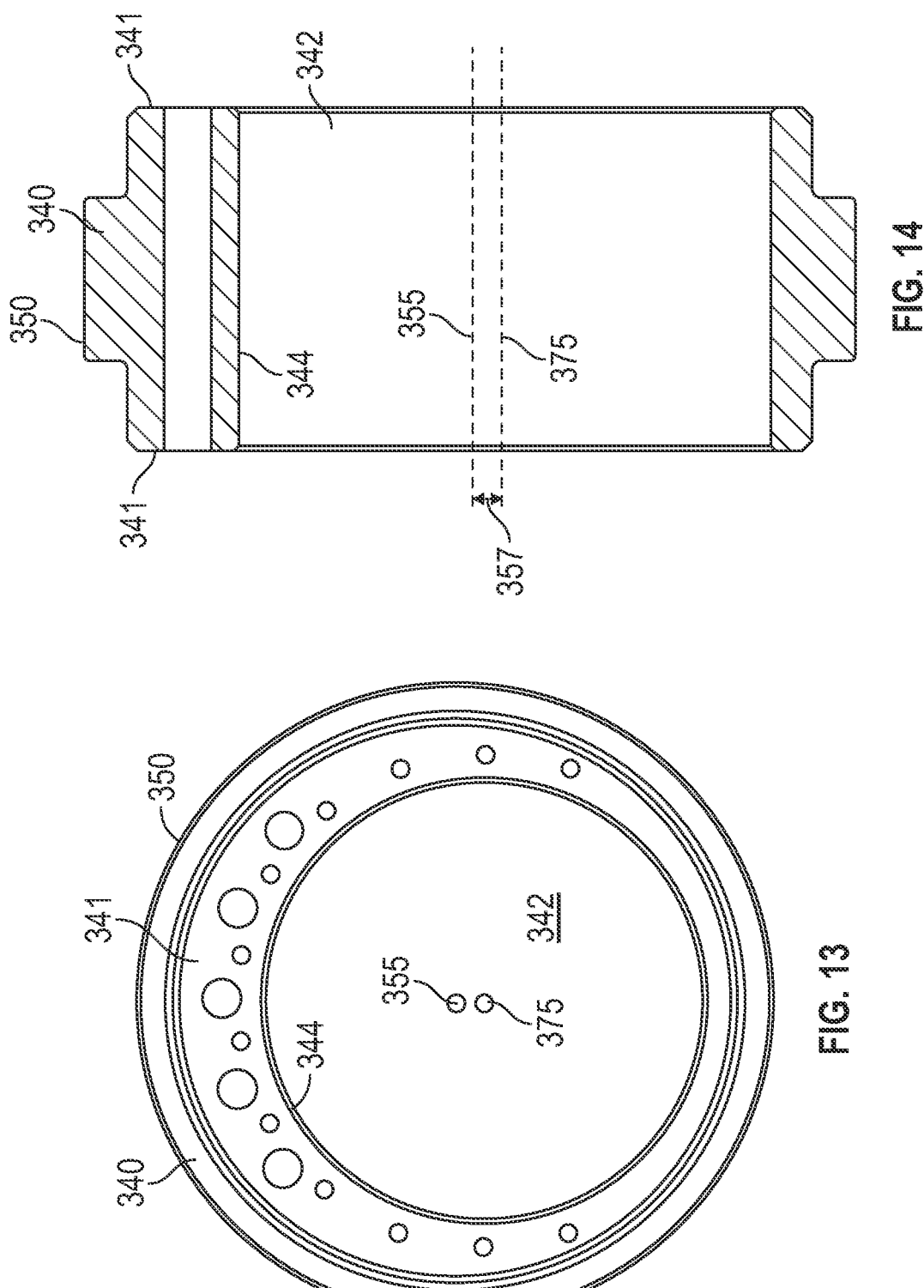
FIG. 13 is a front view of the eccentric bearing spacer of FIG. 12.
FIG. 14 is a side cross-sectional view of the eccentric bearing spacer of FIG. 12.

The outer bearing surface 350 of bearing spacer 340 has a central or longitudinal axis 355 which is radially offset by a non-zero radial offset 357 (shown in FIG. 14). The outer bearing assembly 310 is supported on the outer bearing surface 350 while the inner bearing assembly 370 is supported on the inner bearing surface 344 of bearing spacer 340. As will be described further herein, the radial offset 357 between axes 355, 375 permits for the translation of orbital motion about rotational drive axis 155 into concentric rotational motion about rotational axis 375. Axes 355, 375 of bearing spacer 340 may also be referred to herein as outer bearing rotational axis 355 and inner bearing rotational axis 375, respectively.

In this exemplary embodiment, the inner bearing assembly 370 comprises a plurality of cylindrical rollers 372 housed within a bearing race 374 supported on the inner bearing surface 344 of bearing spacer 340 (the bearing race 314 of outer bearing assembly 310 being supported on outer bearing surface 350 of bearing spacer 340). As will be described further herein, inner bearing assembly 370 permits relative rotation between the inner magnetic rotor 252 and a component of the internal support structure 500. In other embodiments, the configuration of inner bearing assembly 370 may vary; for example, inner bearing assembly 370 may comprise a plurality of ball bearings or other types of rolling elements other than cylindrical rollers 372.

Figures 15, 16:
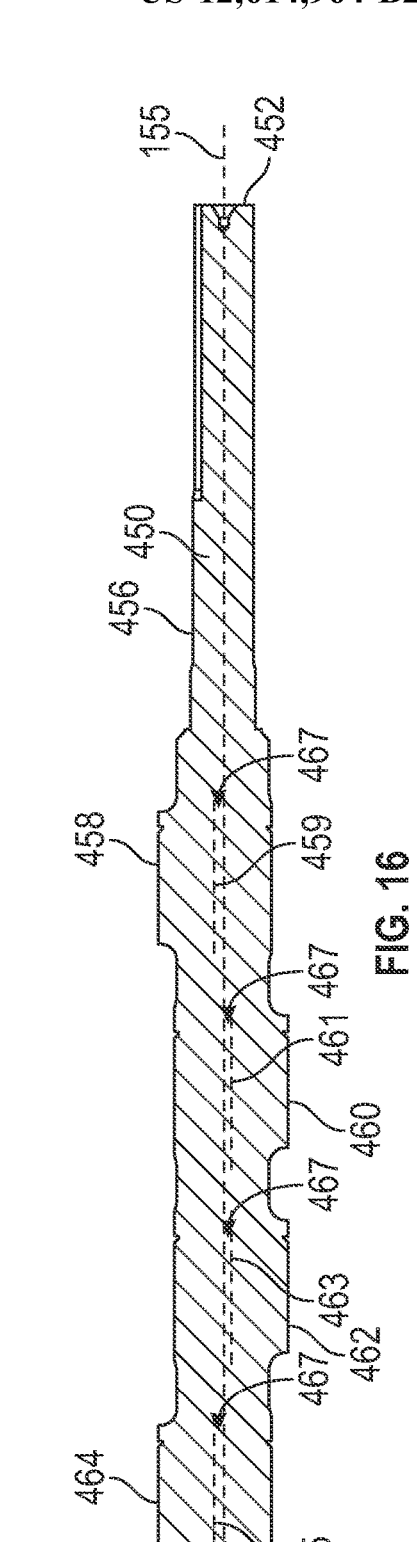
FIG. 15 is a perspective view of the inner drive shaft of FIG. 5.
FIG. 16 is a side cross-sectional view of the inner drive shaft of FIG. 5.

Referring now to FIGS. 15, 16, views of the inner drive shaft 450 of magnetic transmission system 100 are shown. In this exemplary embodiment, inner drive shaft 450 has a central or longitudinal axis coaxial with rotational drive axis 155. Thus, rotational drive axis 155 may also be referred to herein as the central axis 155 of inner drive shaft 450. Additionally, the inner drive shaft 450 comprises a first longitudinal end 452, a second longitudinal end 454 opposite the first longitudinal end 452, and a generally cylindrical outer surface 456 extending between longitudinal ends 452, 454.

In this exemplary embodiment, the outer surface 456 comprises a plurality of eccentric lobes 458, 460, 462, and 464. Each eccentric lobe 458, 460, 462, and 464 of inner drive shaft 450 comprises a central or longitudinal axis 459, 461, 463, and 465, respectively. The central axis 459, 461, 463, and 465 of each eccentric lobe 458, 460, 462, and 464, respectively, is radially offset by a non-zero radial offset 467 from the central axis 155 of inner drive shaft 450. In this exemplary embodiment, radial offset 467 is equal in magnitude to the radial offset 357 of the bearing spacer 340 of each of the eccentric bearing assemblies 300. Additionally, in this exemplary embodiment, while the magnitude of the radial offset 467 of each of the eccentric lobes 458, 460, 462, and 464 is equal in magnitude, the radial offset 467 of eccentric lobes 458 464 is circumferentially spaced approximately 180 degrees from the radial offset 467 of eccentric lobes 460, 462.

Referring now to FIGS. 7-9, 15, and 16, each of the inner magnetic rotors 252 of inner gear ring 250 are supported on one of the eccentric lobes 458, 460, 462, and 464. Particularly, eccentric lobes 458, 460, 462, and 464 are received within the central bearing assemblies 264 of the inner magnetic rotors 252 such that the central axes 459, 461, 463, and 465 of the 459, 461, 463, and 465, respectively, define the central axes of the inner magnetic rotors 252 (e.g., central axis 459 comprises a central axis of a first inner magnetic rotor 252, central axis 461 comprises a central axis of a second inner magnetic rotor 252, and so on and so forth). In some embodiments, a bearing retainer or other retention mechanism may be positioned radially between the central bearing assemblies 264 of inner magnetic rotors 252 and the eccentric lobes 458, 460, 462, and 464. The radial offset 467 between central axes 459, 461, 463, and 465 and the rotational drive axis 155 results in the orbital motion of inner magnetic rotors 252 about central axis 155, with the magnitude of radial offset 467 defining the degree of eccentricity or radius of the orbital trajectory of the inner magnetic rotors 252 about central axis 155.

Additionally, given that the radial offsets 467 of eccentric lobes 458, 464 are circumferentially spaced approximately 180 degrees from eccentric lobes 460, 462, the harmonic and vibrational forces produced by the inner magnetic rotors 252 coupled to eccentric lobes 458, 464 are counterbalanced by the harmonic and vibrational forces produced by the inner magnetic rotors 252 coupled to eccentric lobes 460, 462.

Figure 17:
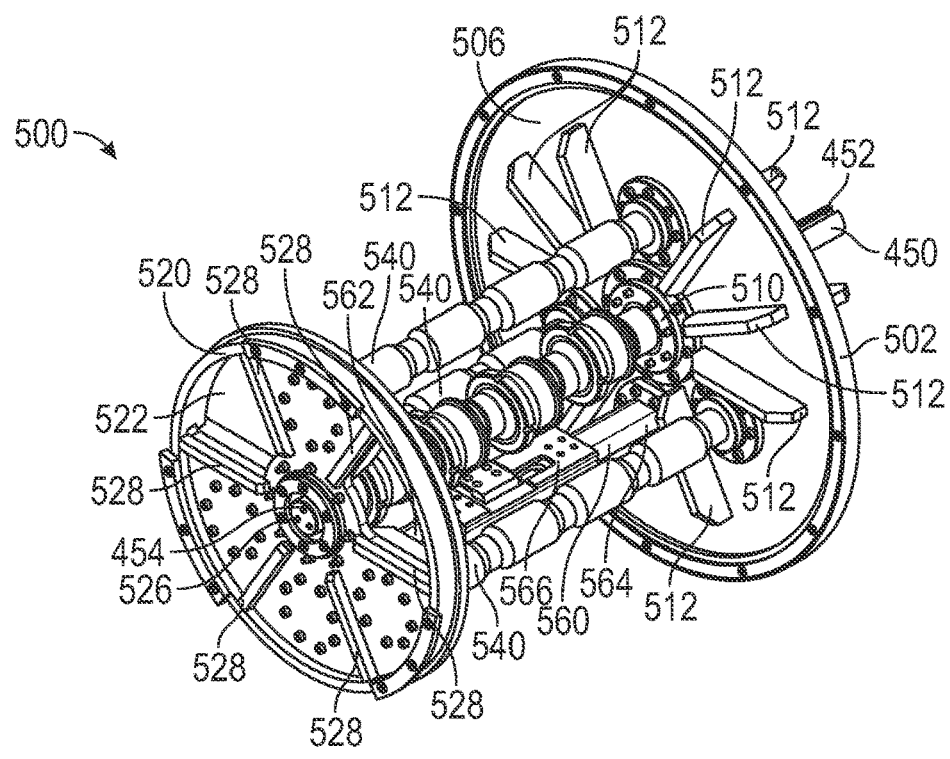
FIGS. 17, 18 are perspective views of the internal support structure of FIG. 5.
Figure 18:
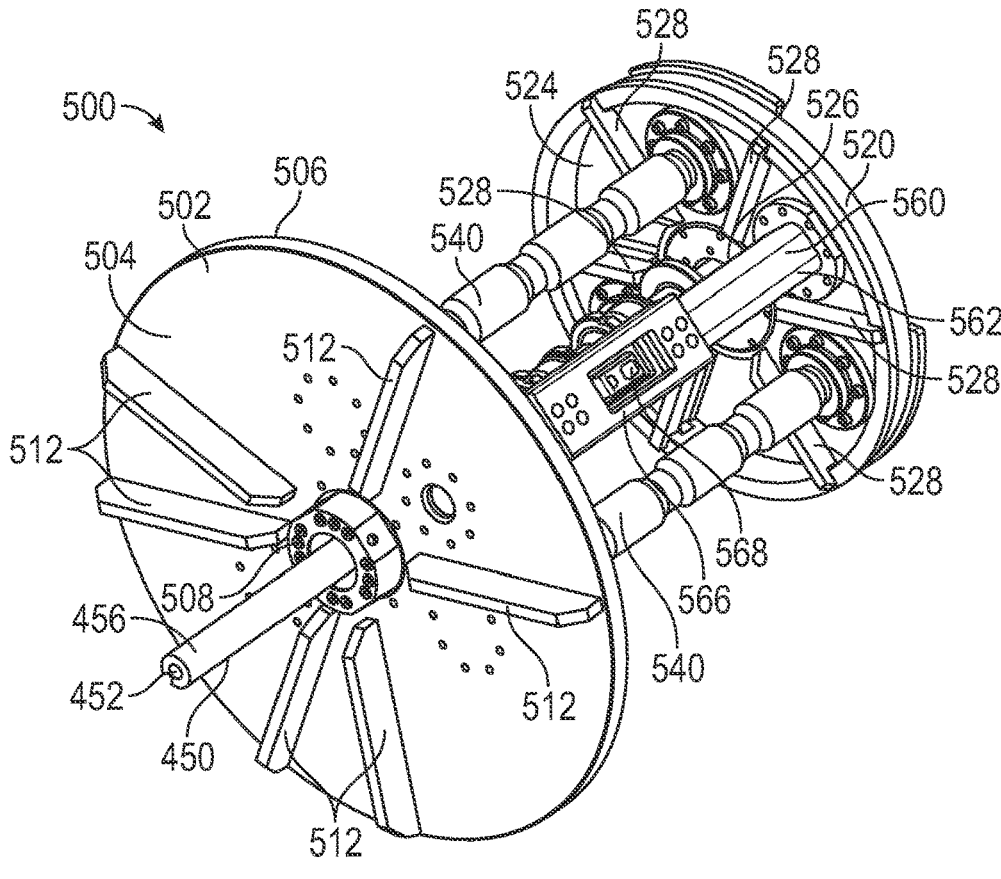

Referring now to FIGS. 17, 18, views of the internal support structure 500 of magnetic transmission system 100 are shown. Internal support structure 500 is generally configured to stabilize the positions of gear rings 150, 250 during operation of magnetic transmission system 100 so as to minimize deflections in the gear rings 150, 250 resulting from the weight of gear rings 150, 250 and the magnetic forces applied to gear rings 150, 250 during the operation of magnetic transmission system 100 which may interfere with the reliability and performance of system 100. For example, the magnetic coupling produced between gear rings 150, 250 during the operation of magnetic transmission system 100 may produce dynamic loads urging the internal magnetic rotors 252 to rotate about rotational drive axis 155.

Additionally, given that magnetic transmission system 100 comprises a plurality of outer magnetic rotors 160 and corresponding inner magnetic rotors 252 spaced along rotational drive axis 155, the weight of magnetic rotors 160, 252 and/or dynamic loads produced during the operation of system 100 may urge a portion of system 100 to sag or deflect orthogonally relative to rotational drive axis 155. Internal support structure 500 is configured to resist these loads such that gear rings 150, 250 maintain their intended positions during the operation of magnetic transmission system 100.

In this exemplary embodiment, internal support structure 500 generally includes a first or static plate 502, a second or rigidity plate 520, a plurality of circumferentially spaced static rod 540, and an elongate rigidity member 560. Plates 502, 520 support outer gear ring 150 via the bearing assembly of external support structure 102 to which is coupled to static plate 502. Additionally, plates 502, 520 support inner gear ring 250 via the static rods 540 and rigidity member 560 as will be discussed further herein. Static plate 502 is generally annular and comprises a first or outer endface or surface 504, an opposing second or inner endface or surface 506, and a central opening or passage 508. In this exemplary embodiment, a radial bearing assembly 510 is positioned within the central passage 508 of static plate 502. Radial bearing assembly 510 is configured to support the inner drive shaft 450 of magnetic transmission system 100. Radial bearing assembly 510 may comprise a plurality of rolling elements such as rollers, ball bearings, etc.

In this exemplary embodiment, a plurality of elongate supports or gussets 512 are formed on each endface 504, 506 of static plate 502. Gussets 512 are circumferentially spaced and extend radially outwards from the central passage 508 of static plate 502 towards an outer circumference of static plate 502. Gussets 512 are generally configured to increase the structural rigidity of static plate 502 such that plate 502 may resist the dynamic loads (e.g., loads imparted by the magnetic attraction between gear rings 20, 30, and centrifugal loads generated by the orbital motion of inner gear ring 30) imparted thereto during the operation of magnetic transmission system 100. In other embodiments, static plate 502 may not include gussets 512. For instance, in some embodiments, static plate 502 may include other features (e.g., ribs, structural members in tension or compression, etc.) configured for increasing the structural rigidity thereof.

Static plate 502 is stationary relative to external support structure 102 and is exposed to the surrounding environment. In some embodiments, static plate 502 may be rigidly coupled to a mount of a system comprising the magnetic transmission system 100, thereby restricting relative movement between the static plate 502 and the mount. Thus, static plate 502 of internal support structure 500 may be held statically by the mount coupled to magnetic transmission system 100.

The rigidity plate 520 of internal support structure 500 is also generally annular and comprises a first or outer endface or surface 522, and an opposing second or inner endface or surface 524. In this exemplary embodiment, a bearing assembly 526 is positioned centrally within rigidity plate 520 and is configured to receive and support the second longitudinal end 454 of the inner drive shaft 450 of magnetic transmission system 100. Radial bearing assembly 526 may comprise a plurality of rolling elements such as rollers, ball bearings, etc.

Similar to static plate 502 described above, in this exemplary embodiment, a plurality of elongate supports or gussets 528 are formed on each endface 522, 524 of rigidity plate 520. Gussets 528 are circumferentially spaced and extend radially outwards from radial bearing assembly 526 of rigidity plate 520 towards an outer circumference of rigidity plate 520. Similar to gussets 512 of static plate 502, gussets 528 of rigidity plate 520 are generally configured to increase the structural rigidity of rigidity plate 520 such that plate 520 may resist the dynamic loads imparted thereto during the operation of magnetic transmission system 100. In other embodiments, rigidity plate 520 may not include gussets 528. For instance, in some embodiments, rigidity plate 520 may include other features configured for increasing the structural rigidity thereof.

Unlike static plate 502, rigidity plate 520 is housed within the outer ring 150 of magnetic transmission system 100. For this reason, rigidity plate 520 cannot be externally supported by a mount or other device of the system in which magnetic transmission system 100 is incorporated. Instead, rigidity plate 520 is supported by the static plate 502 via the static rods 540 and rigidity member 560 of internal support structure 500. Particularly, static rods 540 and rigidity member 560 each extend entirely between and couple with (e.g., via one or more fasteners) the inner endfaces 506, 524 of plates 502, 520, respectively.

In this exemplary embodiment, internal support structure 500 comprises three generally cylindrical static rods 540 circumferentially spaced equidistantly about the rotational drive axis 155 of magnetic transmission system 100. In other embodiments, the number and/or spacing of static rods 540 may vary. The three static rods 540 correspond in number with the three eccentric bearing assemblies 300 of each inner magnetic rotor 252 of inner gear ring 250.

Particularly, in this exemplary embodiment, static rods 540 extend through and are rotatably coupled with the eccentric bearing assemblies 300 of each inner magnetic rotor 252, thereby preventing rotation of each inner magnetic rotor 252 about the rotational drive axis 155 of magnetic transmission system 100. In this configuration, the inner bearing assembly 370 of each eccentric bearing assembly 300 is rotatably coupled to one of the static rods 540 whereby relative rotation is permitted between the bearing spacer 340 and outer bearing assembly 310 and the static rod 540 about the rotational axis 375 of the inner bearing assembly 370. Given that the magnitude of the radial offset 357 is the same as the magnitude of the radial offset 467 of eccentric lobes 458, 460, 462, and 464, the orbital or cycloidal motion of each inner magnetic rotor 252 about rotational drive axis 155 is translated into concentric rotational motion of each eccentric bearing assembly 300 about its respective rotational axis 375.

The rigidity member 560 of internal support structure 500 is configured enhance the structural rigidity of internal support structure 500, and in particular the rigidity of rigidity plate 520, which as described above, cannot be supported directly by a mount or other feature external the outer gear ring 150. Particularly, rigidity member 560 is configured to resist rotation of rigidity plate 520 relative to static plate 502 about rotational drive axis 155 urged by dynamic loading produced during the operation of magnetic transmission system 100.

Rigidity member 560 is radially offset from the rotational drive axis 155 and does not contact any of the inner magnetic rotors 252 of inner gear ring 250. Although in this embodiment internal support structure 500 comprises a single rigidity member 560, in other embodiments, internal support structure 500 may comprise a plurality of members 560. In still other embodiments, internal support structure 500 may only comprise static rods 540 and may not include rigidity member 560.

In this exemplary embodiment, rigidity member 560 comprises a pair of elongate support beams 562, 564 connected together end-to-end at a coupler 566 positioned between the static plate 502 and rigidity plate 520. Support beams 562, 564 each comprise tubular beams having a non-circular cross-section (e.g., square or rectangular in this exemplary embodiment); however, in other embodiments, the configuration of support beams 562, 564 may vary. In this exemplary embodiment, coupler 566 comprises a sensor assembly 568 positioned between the support beams 562, 564. Sensor assembly 568 comprises a position sensor configured to monitor the radial or air gap formed between the outer gear ring 20 and inner gear ring 30. As the inner gear ring 30 travels cycloidally the radial gap between outer gear ring 20 and inner gear ring 30 cyclically varies. Sensor assembly 568 allows for the monitoring of the radial gap to ensure that the gap does not decrease to zero and allow for the outer gear ring 20 to contact the inner gear ring 30 and thereby damage the gear rings 20, 30. For example, sensor assembly 568 may provide a warning to an operator of magnetic transmission system 10 should the magnetic transmission system 10 exhibit a radial gap between gear rings 20, 30 that is less than a predefined or minimum allowable radial gap. Sensor assembly 568 may also shut down magnetic transmission system 10 should the radial gap fall below the minimum allowable radial rap. In this manner, the structural integrity of internal support structure 500 may be monitored during operation of magnetic transmission system 100.

While disclosed embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A magnetic transmission system, comprising:
an outer gear ring comprising an outer plurality of permanent magnets and configured to rotate about a rotational drive axis;
an inner gear ring positioned within the outer gear ring and comprising an inner plurality of permanent magnets magnetically coupled to the outer plurality of permanent magnets, and a plurality of eccentric bearing assemblies circumferentially spaced about the rotational drive axis each comprising an annular bearing spacer, and wherein each of the plurality of eccentric bearing assemblies is configured to convert orbital motion of the inner gear ring about the rotational drive axis into rotational motion of the eccentric bearing assembly about a bearing rotational axis that is radially offset from the rotational drive axis; and
a first drive shaft coupled to the outer gear ring and a second drive shaft coupled to the inner gear ring, wherein the outer gear ring and the inner gear ring are configured to provide a gear ratio between the first drive shaft and the second drive shaft;
wherein the bearing spacer of each of the plurality of eccentric bearing assemblies comprises a central passage, an outer bearing surface surrounding the central passage and having a central axis that extends through the central passage, and an inner bearing surface defining the central passage and having a central axis that extends through the central passage and is radially offset from the central axis of the outer bearing surface.

2. The magnetic transmission system of claim 1, wherein the inner gear ring is coupled to the first drive shaft by an eccentric lobe comprising a central axis that is radially offset from the rotational drive axis.

3. The magnetic transmission system of claim 2, wherein the bearing rotational axis comprises an inner bearing rotational axis of one of the plurality of eccentric bearing assemblies and wherein the eccentric bearing assembly also comprises an outer bearing rotational axis radially offset from inner bearing rotational axis, and wherein the radial offset between the central axis of the eccentric lobe and the rotational drive axis is equal to the radial offset between the inner bearing rotational axis and the outer bearing rotational axis.

4. The magnetic transmission system of claim 1, wherein:
the outer gear ring comprises a plurality of separate outer magnetic rotors spaced along the rotational drive axis and the inner gear ring comprises a plurality of separate inner magnetic rotors spaced along the rotational drive axis; and
wherein each of the plurality of inner magnetic rotors comprises at least one of the plurality of eccentric bearing assemblies.

5. The magnetic transmission system of claim 1, wherein the bearing rotational axis comprises an inner bearing rotational axis, and each of the eccentric bearing assembly comprises an outer bearing assembly rotatable about an outer bearing rotational axis, and an inner bearing assembly rotatable about the inner bearing rotational axis which is radially offset from the outer bearing rotational axis.

6. The magnetic transmission system of claim 1, further comprising an internal support structure comprising a static plate and a rigidity plate connected to the static plate by a static rod radially offset from the rotational drive axis and extending between the static plate and the rigidity plate, and wherein the static rod extends through the inner gear ring.

7. The magnetic transmission system of claim 6, wherein the static rod prevents the inner gear ring from rotating about the rotational drive axis.

8. The magnetic transmission system of claim 1, further comprising a sensor assembly configured to monitor a radial gap formed between the inner gear ring and the outer gear ring.

9. A magnetic transmission system, comprising:
an outer gear ring comprising an outer plurality of permanent magnets and configured to rotate about a rotational drive axis;
an inner gear ring positioned within the outer gear ring and comprising an inner plurality of permanent magnets magnetically coupled to the outer plurality of permanent magnets, and a plurality of eccentric bearing assemblies circumferentially spaced about the rotational drive axis, each of the plurality of eccentric bearing assemblies comprising a bearing spacer, an outer bearing assembly rotatable about an outer bearing rotational axis, and an inner bearing assembly rotatable about an inner bearing rotational axis of the bearing spacer that is radially offset from the outer bearing rotational axis; and
a first drive shaft coupled to the outer gear ring and a second drive shaft coupled to the inner gear ring, wherein the outer gear ring and the inner gear ring are configured to provide a gear ratio between the first drive shaft and the second drive shaft;
wherein the bearing spacer of each of the plurality of eccentric bearing assemblies comprises a central passage, an outer bearing surface surrounding the central passage having a central axis that extends through the central passage, and an inner bearing surface defining the central passage and having a central axis that extends through the central age and is radially offset from the central axis of the outer bearing surface.

10. The magnetic transmission system of claim 9, wherein each of the plurality of eccentric bearing assemblies comprises an arcuate counterweight coupled to the bearing spacer.

11. The magnetic transmission system of claim 9, wherein the outer bearing assembly of each of the plurality of eccentric bearing assemblies is positioned on the outer surface of the bearing spacer that defines the outer bearing rotational axis, and the inner bearing assembly is positioned on the inner surface of the bearing spacer that defines the inner bearing rotational axis.

12. The magnetic transmission system of claim 9, wherein:
the outer gear ring comprises a plurality of separate outer magnetic rotors spaced along the rotational drive axis and the inner gear ring comprises a plurality of separate inner magnetic rotors spaced along the rotational drive axis; and
wherein each of the plurality of inner magnetic rotors comprises at least one of the plurality of eccentric bearing assemblies.

13. The magnetic transmission system of claim 9, wherein:
the inner gear ring is coupled to the first drive shaft by an eccentric lobe comprising a central axis that is radially offset from the rotational drive axis; and
the radial offset between the central axis of the eccentric lobe and the rotational drive axis is equal to the radial offset between the inner bearing rotational axis and the outer bearing rotational axis.

14. The magnetic transmission system of claim 9, further comprising an internal support structure comprising a static plate and a rigidity plate connected to the static plate by a static rod radially offset from the rotational drive axis and extending between the static plate and the rigidity plate, and wherein the static rod extends through the inner gear ring.

15. The magnetic transmission system of claim 14, wherein the static rod prevents the inner gear ring from rotating about the rotational drive axis.

16. The magnetic transmission system of claim 9, further comprising a sensor assembly configured to monitor a radial gap formed between the inner gear ring and the outer gear ring.

17. A magnetic transmission system, comprising:
an outer gear ring comprising an outer plurality of permanent magnets and configured to rotate about a rotational drive axis;
an inner gear ring positioned within the outer gear ring and comprising an inner plurality of permanent magnets magnetically coupled to the outer plurality of permanent magnets;
a first drive shaft coupled to the outer gear ring and a second drive shaft coupled to the inner gear ring, wherein the outer gear ring and the inner gear ring are configured to provide a gear ratio between the first drive shaft and the second drive shaft; and an internal support structure comprising a static plate, and a rigidity plate positioned in the outer gear ring and connected to the static plate by a static rod radially offset from the rotational drive axis and extending between the static plate and the rigidity plate, and wherein the static rod extends through the inner gear ring.

18. The magnetic transmission system of claim 17, wherein the static rods prevent the inner gear ring from rotating about the rotational drive axis.

19. The magnetic transmission system of claim 17, wherein a plurality of gussets extending radially from the rotational drive axis are formed on the static plate and the rigidity plate of the internal support structure.

20. The magnetic transmission system of claim 17, wherein the internal support structure further comprises an elongate rigidity member coupled to and extending between the static plate and the rigidity plate, wherein the rigidity member has a non-circular cross-section.

21. The magnetic transmission system of claim 17, further comprising an eccentric bearing assembly comprising a bearing spacer, an outer bearing assembly rotatable about an outer bearing rotational axis, and an inner bearing assembly rotatable about an inner bearing rotational axis of the bearing spacer that is radially offset from the outer bearing rotational axis.

22. The magnetic transmission system of claim 21, wherein the static rod is rotatably coupled to the inner gear ring by the eccentric bearing assembly.

23. The magnetic transmission system of claim 17, further comprising a sensor assembly configured to monitor a radial gap formed between the inner gear ring and the outer gear ring.

* * * * *